United States Patent
Takabayashi

Patent Number: 5,898,707
Date of Patent: Apr. 27, 1999

[54] DATA SAMPLING CIRCUIT AND PORTABLE RADIO TERMINAL DEVICE

[75] Inventor: Yasutaka Takabayashi, Tokyo, Japan

[73] Assignee: Oki Electric Industry Co., Ltd., Tokyo, Japan

[21] Appl. No.: 08/828,564

[22] Filed: Mar. 31, 1997

[30] Foreign Application Priority Data

Apr. 16, 1996 [JP] Japan ..................... 8-093936

[51] Int. Cl.$^6$ ................................. H03M 13/00
[52] U.S. Cl. ..................... 371/37.07; 370/340; 370/341; 370/350; 455/10; 455/215; 455/257; 455/157.2
[58] Field of Search ................... 371/37.07; 375/27, 375/244, 341, 340, 347, 200; 370/350, 484; 455/20, 215, 10, 257, 157.2

[56] References Cited

U.S. PATENT DOCUMENTS

| | | | |
|---|---|---|---|
| 5,109,530 | 4/1992 | Stengel | 455/38.3 |
| 5,230,089 | 7/1993 | Kindinger et al. | 455/79 |
| 5,327,461 | 7/1994 | Kushige | 375/244 |

*Primary Examiner*—Reba I. Elmore
*Assistant Examiner*—McDieunel Marc
*Attorney, Agent, or Firm*—Jones, Volentine, Steinberg & Whitt, L.L.P.

[57] ABSTRACT

A data sampling circuit samples radio signal data made up of plural successive sets of data, each set of data having a given number of data bits. A first shift register holds and shifts the data bits of the radio signal data to successively obtain sampled radio signal data for each set of data of the radio signal data. A data holding section successively receives and holds each set of the sampled radio signal data held by the first shift register. Also, a processor successively receives, bit by bit, each set of sampled radio signal data held by the data holding section, and processes each set of sampled radio signal data in accordance with a given processing procedure. The data holding section completes reception of each set of sampled radio signal data from the first shift register before the first shift register holds a first data bit of each next set of data of the radio signal data.

20 Claims, 2 Drawing Sheets

DATA SAMPLING CIRCUIT AND PORTABLE RADIO TERMINAL DEVICE

BACKGROUND OF THE INVENTION

The present invention relates to a data sampling circuit which deals with a radio signal, and to a portable radio terminal device such as a pager which incorporates the data sampling circuit. In particular, the present invention relates to a data sampling circuit for a decoder of a pager which receives a radio signal and detects a user specific number contained therein to initiate a given processing procedure.

A radio paging operation takes place with respect to a small size radio receiver such as a pager carried by a person who is off his or her office or desk to let him or her know the occurrence of a need of communication by a calling tone, a vibration or a displayed message.

A radio paging system in the pager includes POCSAG (Post Office Code Standardization Advisory Group) coding scheme. A code word used in the POCSAG coding scheme has four types including a synchronization (sync) code word, an address code word, a message code word and an idle code word, each consisting of 32 bit data.

In general, a conventional data sampling circuit includes a 32 bit shift register, namely, a shift register having 32 stages, and an output from each stage is connected to a preamble detector and a sync code word detector, respectively. When a thirty second bit data is sampled by the shift register in accordance with a receiving timing of the address code word or the message code word which consists of 32 bit data, the 32 bit data contained in the shift register is transferred in a serial manner to the error correction unit in synchronization with a system clock before the sampling of a next 32 bit data is started.

However, with the above-mentioned conventional data sampling circuit as used in a digital portable radio terminal device, if the system clock has 32 clocks or less in an interval corresponding to a data length of a single bit of the radio signal, the sampling of a next 32 bit data will begin before the reception of the 32 bit data is completed. With the result that, there is a problem of a misalignment occurring in the data sampling in unit of 32 bits.

SUMMARY OF THE INVENTION

It is an object of the present invention to provide a data sampling circuit which enables an accurate data sampling operation in unit of a given number of bits without involving a misalignment in the sampling data, and a portable radio terminal device which incorporates this data sampling circuit.

According to the present invention, a data sampling circuit has a first shift register for sampling bit by bit a radio signal data which is constructed in unit of a given number of bits, thereby holding and shifting a sampling data; a data holding section for holding the sampling data; and a processor for receiving bit by bit the sampling data from the data holding section, thereby processing the sampling data in accordance with a given processing procedure. The data holding section completes a reception of the sampling data corresponding to the radio signal data of the given number of bits from the first shift register at least before a time when a sampling of a first bit data in a next radio signal data which is constructed in unit of a given number of bits subsequent to the radio signal data is initiated by the first shift register.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A preferred embodiment of the present invention will be described with reference to the accompanying drawings.

Figure 1:
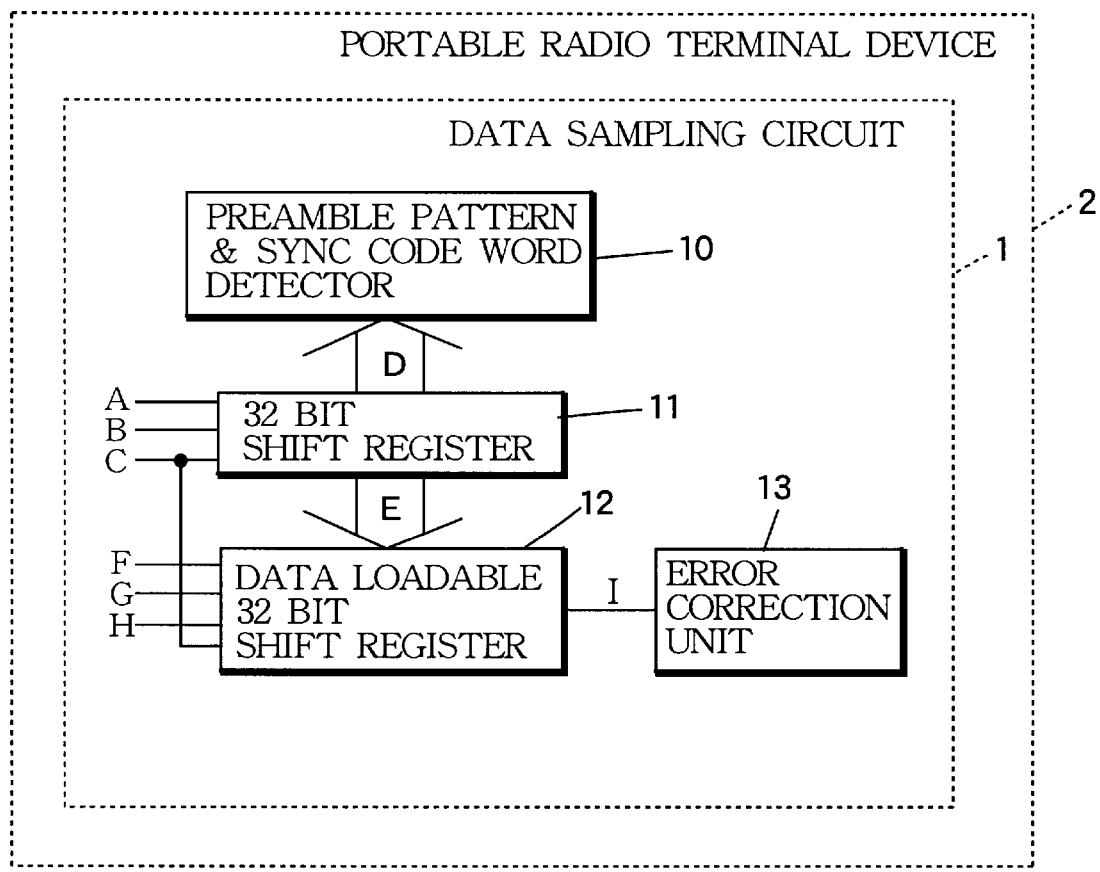
FIG. 1 is a block diagram showing a construction of a data sampling circuit and a portable radio terminal device according to one embodiment of the present invention.

Referring to FIG. 1, a data sampling circuit 1 according to the present invention may be incorporated in a digital portable radio terminal device 2 such as a pager.

The data sampling circuit 1 includes a preamble pattern and sync code word detector 10, a 32 bit shift register 11 (hereinafter referred to as "shift register 11") for sampling a radio signal data, a data loadable 32 bit shift register 12 (hereinafter referred to as "data loadable shift register 12") for receiving the data sampled by the shift register 11, thereby holding and shifting the data sampled by the shift register 11, and an error correction unit 13 for receiving and processing the data held by the data loadable shift register 12 in accordance with a given processing procedure.

The preamble pattern and sync code word detector 10 detects a preamble which is used to achieve a bit synchronization between a transmitting system and a receiving system, and a sync code word which is used to distinguish between physical slots in a data train delivered from a modem, and then delivers the preamble and the sync code word to a controller (not shown).

The shift register 11 has 32 stages and performs a data sampling for a radio signal data A which is constructed in unit of 32 bits in synchronization with a sampling clock signal B.

As mentioned previously, a code word according to the POCSAG coding scheme is of four types including a sync code word, an address code word, a message code word and an idle code word, each consisting of 32 bit data. The shift register 11 samples data of each bit in synchronization with a sampling clock signal B (see FIG. 2), and delivers the sampling data corresponding to each bit to the preamble pattern and sync code word detector 10, and the data loadable shift register 12.

The data loadable shift register 12 is used for a data transfer from the shift register 11 to the error correction unit 13. When the thirty second bit data in the 32 bit radio signal data is sampled by the shift register 11, the data contained in each stage of the shift register 11 is directly loaded into a corresponding stage of the data loadable shift register 12. The data loadable shift register 12 completes a reception of the sampling data corresponding to the 32 bit radio signal data from the shift register 11 at least before a time when a sampling of a first bit data in a next 32 bit radio signal data subsequent to the 32 bit radio signal data is initiated by the shift register 11. In this embodiment, the data loadable shift register 12 holds the 32 bit data from the shift register 11 for delivery to the error correction unit 13 at least until the sampling of the next 32 bit radio signal data is started by the shift register 11.

Thus, it will be seen that even when the next sampling of the code word is started by the shift register 11, the data loadable shift register 12 holds a previous set of 32 bit data for the purpose of data transfer to the error correction unit 13.

The above-mentioned error correction unit 13 performs an error check of an output from the data loadable shift register 12 according to CRC (cyclic redundancy check) code, which is capable of detecting not only a random code, but also a burst error, and also enables a correction of an error.

In FIG. 1, various signals appearing at selected parts of the data sampling circuit are shown by characters A to I. A signal designated by A represents a radio signal data which is input to the shift register 11, a signal B represents a sampling clock signal which is used to sample the radio signal data by the shift register 11, a signal C represents a reset signal which resets the both the shift register 11 and the data loadable shift register 12, and signals D and E represent outputs from the individual stages of the 32 bit shift register 11. It will be noted that thirty two outputs are connected to both a data load input of the preamble pattern and sync code word detector 10 and a data load input of the data loadable shift register 12.

A signal F represents a data input to a flipflop which forms the first stage of the data loadable shift register 12, which voltage is normally fixed to a ground level or a power supply voltage level. A signal G represents a system clock signal used in the data loadable shift register 12, and a signal H represents a data load enable signal of the data loadable shift register 12. A signal I represents an output from a flipflop which is the final stage of the data loadable shift register 12, and is connected to the error correction unit 13.

As described above, the shift register 11 is devoted for the sampling of the radio signal data A, while the data loadable shift register 12 is devoted for data transfer to the error correction unit 13.

The operation of the data sampling circuit 1 in the portable radio terminal device 2 constructed in the manner mentioned above will now be described.

Figure 2:
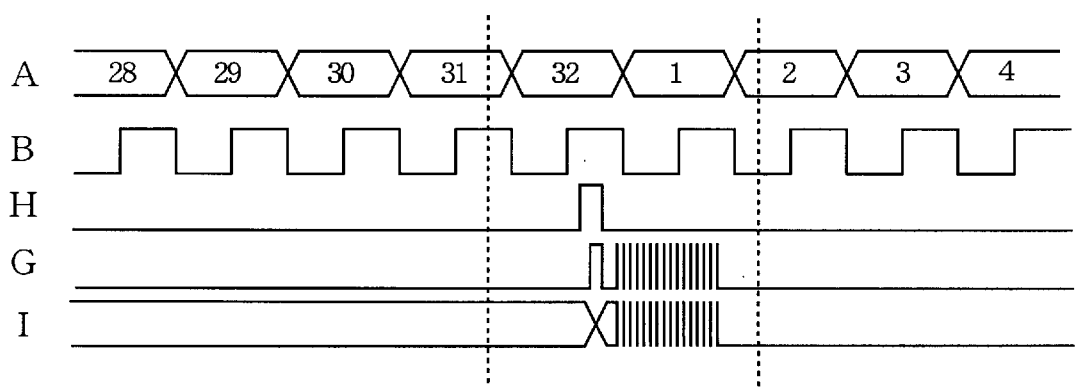
FIG. 2 shows a series of timing charts illustrating the operation of the data sampling circuit of FIG. 1.
Figure 3:
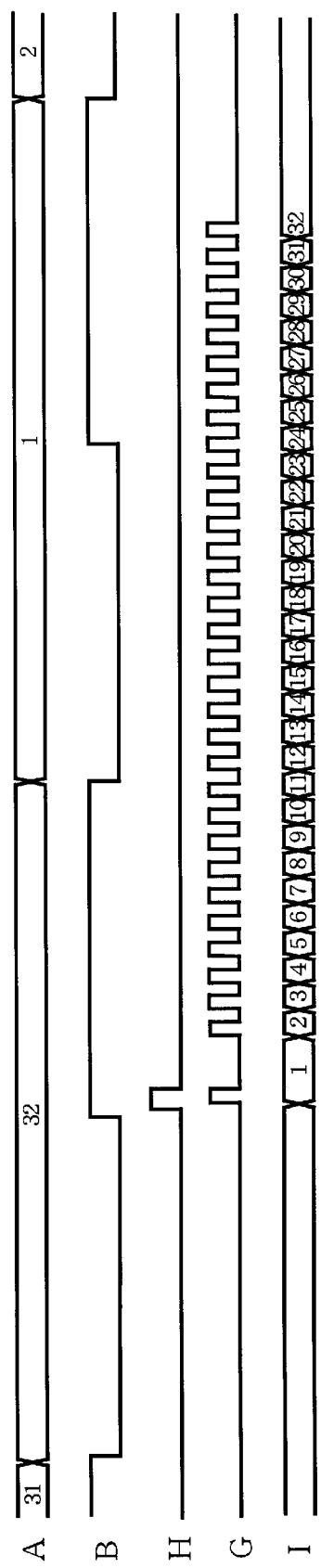
FIG. 3 shows a series of timing charts enlarging a portion indicated in FIG. 2 which is delineated between broken lines.

FIG. 2 is a timing chart illustrating the operation of the data sampling circuit of FIG. 1, and FIG. 3 is an enlarged view of a portion indicated in FIG. 2 which is delineated between broken lines. It is to be understood that a number appearing in the row of signal indicates a bit number of the data.

In synchronization with the sampling clock signal B, the radio signal data A which is constructed in unit of 32 bits is sampled bit by bit into the shift register 11. When the thirty second bit data, i.e., final bit data in the 32 bit radio signal data is sampled by the shift register 11, the data load enable signal H becomes active, as shown in. FIGS. 2 and 3. The data loadable shift register 12 therefore receives the sampling data which is constructed in unit of 32 bits between a time when a thirty second bit data in the 32 bit radio signal data is sampled by the shift register 11 and a time when a sampling of a first bit in a next 32 bit radio signal data subsequent to the 32 bit radio signal data is initiated by the shift register 11.

Subsequently, clocks G are used to transfer 32 bit data (output I) which are now stored in the data loadable shift register 12 to the error correction unit 13.

As described above, the radio signal data A is sampled into the shift register 11 using the sampling clock B. After the thirty second bit data in the radio signal data A is sampled, outputs from the respective stages of the shift register 11 is loaded into the corresponding stages of the data loadable shift register 12. Subsequently, before the shift register 11 begins to sample the next 32 bit radio signal data, the data loadable shift register 12 outputs the sampling data for data transfer held therein to the error correction unit 13.

The data loadable shift register 12 hold the 32 bit data which has been loaded thereinto from the shift register 11, even if the next sampling of code word is initiated in the shift register 11. Accordingly, even if there are 32 clocks or less in an interval corresponding to the data length of a single bit of the radio signal data (A in FIG. 2 or 3), a data sampling in unit of 32 bits can take place in an accurate manner.

Accordingly, when the data sampling circuit which exhibits an excellent feature is incorporated into a portable radio terminal device such as the pager which is destined to receive radio signal in order to detect a user specific number contained therein to initiate a given processing procedure, a reliable operation of the portable radio terminal device can be assured.

As described above, the data sampling circuit of this embodiment can be applied to a radio paging device such as the pager, but the application of the data sampling circuit is not limited thereto. The data sampling circuit of this embodiment is equally applicable to any arrangement in which a data sampling is made.

In the above-mentioned embodiment, the data loadable shift register 12 is used for transferring data to the error correction unit 13, but, instead of the use of the data loadable shift register 12, a RAM, for example, may be used for transferring data to the error correction unit 13.

In the above-mentioned embodiment, an example of the processor is illustrated as the error correction unit 13, but it should be understood that any other processing procedure may be applied to data output from the data loadable shift register 13.

In addition, it should also be understood that the type of registers or the number of bits used to construct the data sampling circuit 1 are not limited to the specific example disclosed in the above-mentioned embodiment.

What is claimed is:

1. A data sampling circuit for radio signal data made up of plural successive sets of data, each set of data having a given number of data bits, said data sampling circuit comprising:

a first shift register which holds and shifts the data bits of the radio signal data to successively obtain sampled radio signal data for each set of data of the radio signal data;

a data holding section which successively receives and holds each set of said sampled radio signal data held by said first shift register; and a processor which successively receives, bit by bit, each set of sampled radio signal data held by said data holding section, and which processes each set of sampled radio signal data in accordance with a given processing procedure;

wherein said data holding section completes reception of said each set of sampled radio signal data from said first shift register before said first shift register holds a first data bit of each next set of data of the radio signal data.

2. A data sampling circuit of claim 1, wherein each set of data of said sampled radio signal data is received by said data holding section between a time when said first shift register holds a final data bit of said each set of data of said sampled radio signal data and a time when said first shift register holds said first data bit of said each next set of data of said radio signal data.

3. A data sampling circuit of claim 1, wherein said data holding section holds said each set of data of said sampled radio signal data when said first shift register begins to hold said first data bit of said each next set of data of radio signal data.

4. A data sampling circuit of claim 1, wherein said data holding section includes a second shift register which receives in parallel said each set of data of said sample radio signal data from said first shift register.

5. A data sampling circuit of claim 1, wherein said first shift register holds and shifts said radio signal data in synchronization with a sampling clock signal, said sampling clock having a clocking interval corresponding to an interval of each set of data of said radio signal data.

6. A data sampling circuit of claim 1, wherein said data holding section receives said each set of data of said sampled radio signal data in synchronization with a data load enable signal which is generated between a time when said first shift register holds said final data bit of said each set of data of said sampled radio signal data and a time when said first shift register holds said first data bit of said each next set of data of said radio signal data.

7. A data sampling circuit of claim 1, wherein said processor receives said each set of sampled radio signal data from said data holding section in synchronization with a system clock signal, said system clock signal having a clocking interval equal or less than an interval of each data bit of said radio signal data.

8. A data sampling circuit of claim 1, wherein said given number of data bits is 32 bits.

9. A data sampling circuit of claim 1, wherein said processor includes an error detecting unit which detects a presence or absence of an error in said sampled radio signal data transferred thereto.

10. A data sample circuit of claim 9, wherein said error detecting unit detects an error in said sampled radio signal data according to a cyclic redundancy check code contained in said sampled radio signal data.

11. A portable radio terminal device for receiving radio signal data made up of plural successive sets of data, each set of data having a given number of data bits, said portable radio terminal device comprising a data sampling circuit:

wherein said data sampling circuit comprises:
a first shift register which holds and shifts the data bits of the radio signal data to successively obtain sampled radio signal data for each set of data of the radio signal data;
a data holding section which successively receives and holds each set of said sampled radio signal data held by said first shift register; and
a processor which successively receives, bit by bit, each set of sampled radio signal data held by said data holding section, and which processes each set of sampled radio signal data in accordance with a given processing procedure;
wherein said data holding section completes reception of said each set of sampled radio signal data from said first shift register before said first shift register holds a first data bit of each next set of data of said radio signal data.

12. A portable radio terminal device of claim 11, wherein each set of data of said sampled radio signal data is received by said data holding section between a time when said first shift register holds a final data bit of said each set of data of said sampled radio signal data and a time when said first shift register holds said first data bit of said each next set of data of said radio signal data.

13. A portable radio terminal device of claim 11, wherein said data holding section holds said each set of data of said sampled radio signal data when said first shift register begins to hold said first data bit of said each next set of data of radio signal data.

14. A portable radio terminal device of claim 11, wherein said data holding section includes a second shift register which receives in parallel said each set of data of said sample radio signal data from said first shift register.

15. A portable radio terminal device of claim 11, wherein said first shift register holds and shifts said radio signal data in synchronization with a sampling clock signal, said sampling clock having a clocking interval corresponding to an interval of each set of data of said radio signal data.

16. A portable radio terminal device of claim 11, wherein said data holding section receives said each set of data of said sampled radio signal data in synchronization with a data load enable signal which is generated between a time when said first shift register holds said final data bit of said each set of data of said sampled radio signal data and a time when said first shift register holds said first data bit of said each next set of data of said radio signal data.

17. A portable radio terminal device of claim 11, wherein said processor receives said each set of sampled radio signal data from said data holding section in synchronization with a system clock signal, said system clock signal having a clocking interval equal or less than an interval of each data bit of said radio signal data.

18. A portable radio terminal device of claim 11, wherein said given number of data bits is 32 bits.

19. A portable radio terminal device of claim 11, wherein said processor includes an error detecting unit which detects a presence or absence of an error in said sampled radio signal data transferred thereto.

20. A portable radio terminal device of claim 19, wherein said error detecting unit detects an error in said sampled radio signal data according to a cyclic redundancy check code contained in said sampled radio signal data.

* * * * *